US006003540A

United States Patent [19]

Bruni et al.

[11] Patent Number: 6,003,540

[45] Date of Patent: Dec. 21, 1999

[54] DEVICE FOR CONFINING GAS LEAKS FROM A GAS CYLINDER

[75] Inventors: Maurice Bruni, Tremblay en France; Franck Slootman, Le Mesnil-Saint-Denis, both of France

[73] Assignee: L'Air Liquide, Societe Anonyme Pour L'Etude Et L'Exploitation Des Procedes Georges Claude, France

[21] Appl. No.: 08/861,367

[22] Filed: May 21, 1997

[30] Foreign Application Priority Data

May 21, 1996 [FR] France .................................. 96 06297

[51] Int. Cl.[6] ............................ F16K 27/12; F17C 13/06; F16J 13/02

[52] U.S. Cl. ............................ 137/312; 73/49.2; 73/49.3; 73/46; 137/382; 220/724

[58] Field of Search .................................... 137/312, 377, 137/381, 382; 73/46, 49.2, 49.3; 220/724

[56] References Cited

U.S. PATENT DOCUMENTS

| | | | |
|---|---|---|---|
| 2,465,095 | 3/1949 | Harvey | 137/382 |
| 3,148,690 | 9/1964 | Petersen | 137/15 |
| 4,103,806 | 8/1978 | White | 220/724 |
| 4,478,345 | 10/1984 | Edinger | 137/382 |
| 4,834,137 | 5/1989 | Kawaguchi et al. | 137/312 |
| 4,899,781 | 2/1990 | Monroe | 137/382 |
| 5,086,804 | 2/1992 | Ngai | 137/382 |
| 5,158,204 | 10/1992 | Martrich et al. | 220/724 |
| 5,160,065 | 11/1992 | Libes et al. | 220/724 |
| 5,588,461 | 12/1996 | Plecnik | 137/312 |

FOREIGN PATENT DOCUMENTS 250699 10/1989 Japan .

*Primary Examiner*—George L. Walton

*Attorney, Agent, or Firm*—Burns, Doane, Swecker & Mathis, L.L.P.

[57] ABSTRACT

A device for confining leaks of one or more gases contained in a gas cylinder, which comprises a shroud made of a flexible and nonflammable material which is inert with respect to the gas or gases contained in the cylinder and designed to partially envelope said cylinder, wherein said shroud has an opening provided with means for sealing said shroud to the surface of the cylinder and wherein the shroud is provided with an outlet coupling connected to a line for removing one or more of the gases to a means for neutralizing said one or more gases.

8 Claims, 1 Drawing Sheet

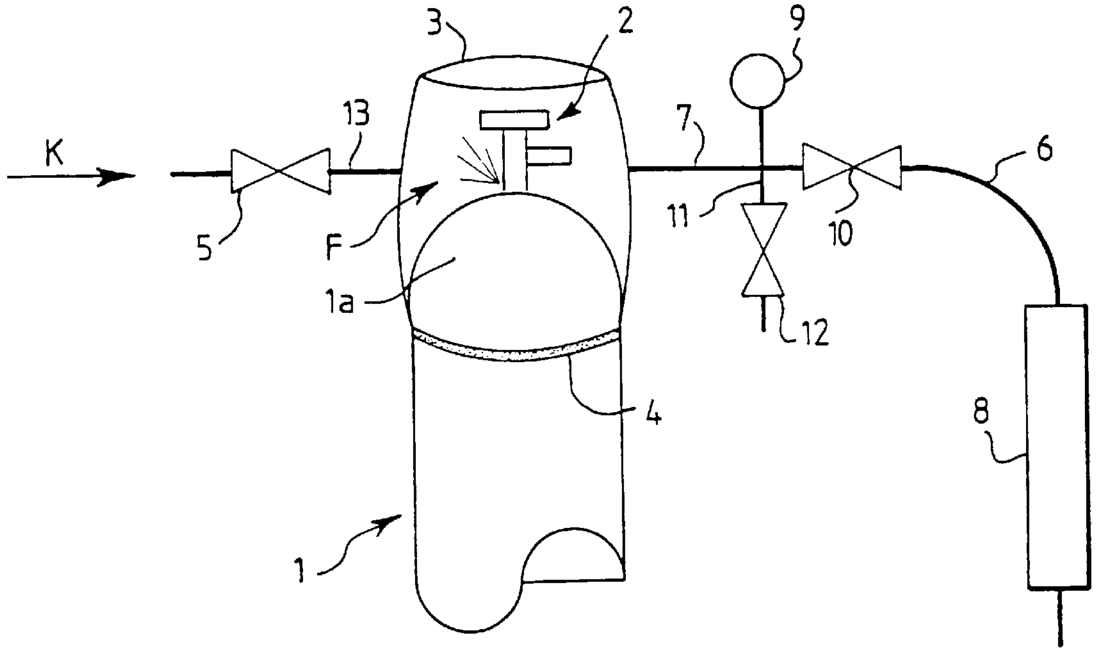
3
2
9
13
7
6
K
5
F
11
10
1a
12
4
8
1

DEVICE FOR CONFINING GAS LEAKS FROM A GAS CYLINDER

BACKGROUND OF THE INVENTION (i) Field of the Invention

The subject of the present invention is a device for confining gas leaks from a gas cylinder.

(ii) Description of the Related Art

When a gas cylinder containing compressed or liquefied toxic gases under pressure has a leak which is impossible to stop (leaks at the collar, for example), there are two solutions. Either the leak is significant and cannot be brought under control, in which case the area where the leaking cylinder is located is evacuated and a safety perimeter is marked out, or the leak is not very great and a pressure-resistant confinement system is then used. The objective is to seek to completely contain the leak in an outer container. The leaking gas cylinder is put in a pressure-resistant confinement chamber.

Various types of construction have thus been developed and marketed. One embodiment consists of a confinement container in which an entire leaking cylinder can be placed.

This device relies on the idea of containing the toxic gases escaping from the cylinder. This is a heavy pressure-resistant system which is difficult to use. This confinement system is expensive, which limits its mass production. The time required to fetch it from the place where it is stored to the site of the incident may furthermore be quite long, the time to set up the confinement system proper requiring some ten minutes.

It should furthermore be noted that this device cannot be used with unstable gases such as acetylene. Likewise, its use with spontaneously inflammable gases ($SiH_4$, $B_2H_6$, etc.) is not recommended.

It is known from U.S. Pat. No. 5,086,804 to produce a smaller container which screws onto the top of the leaking cylinder.

The container according to this second known embodiment has the drawback that it may be geometrically incompatible (thread diameter, screw pitch, etc.).

It is known from U.S. Pat. No. 4,955,404 to screw a bonnet onto the cylinder, which bonnet is then filled with a fusible substance (metal alloy) which, by solidifying, stops the leak. Various systems have also been proposed which aim to contain the leak by applying a counterpressure to the adapter or body of the cylinder, the stop device proper being held in position by a number of metal chains. The aforementioned embodiment, of confinement of the leak by applying a counterpressure to the adapter, has the drawback that the chains are not easy to manipulate.

However, not one of these safety systems can be used to take action in a very short space of time, a few minutes, on a leak which cannot be stopped but which is not out of control.

SUMMARY OF THE INVENTION

The object of the invention is therefore to provide a device for confining gas leaks from a leaking cylinder which is a great deal easier to use, and within much less time than the known systems.

In accordance with the invention, the confinement device comprises a shroud made of a flexible and nonflammable material which is inert with respect to the gases contained in the corresponding cylinder and designed to partially envelope said cylinder; this shroud has an opening provided with means for sealing it to the surface of the cylinder against which the edge of this opening may be applied; said shroud is furthermore provided with an outlet coupling connected to a line designed so that it can remove the gases to a neutralizing means.

Such a device is inexpensive and very quick to use, since a few tens of seconds are long enough for a protected operator to cover the cylinder with the shroud.

The latter can operate at a pressure very slightly greater than atmospheric pressure (a few millibars created by the leak) and may be fitted to cylinders of any capacity, it being possible to provide several appropriate sizes for this purpose.

Thus, instead of being contained in pressure-resistant devices as in the prior embodiments mentioned hereinabove, the gas leak is channeled to an appropriate neutralizing means, making it possible to use a shroud device which is much easier to operate than the prior systems.

The neutralizing means may, for example if there are toxic gases contained in the cylinder, be a cartridge of absorbents of suitable capacity. In the case of corrosive acid gases, the neutralizing means may advantageously be a scrubber system and, in the case of mainly combustible gases, this neutralizing means may be an air-based burner. The outlet coupling is preferably nonflammable.

The neutralizing means may also simply be a nearby volume of water, for example a tank or a quantity of water into which the end of the line is immersed so as to avoid forming a toxic cloud.

The device according to the invention is not only simple and quick to operate, but also has the advantage of being able to be used with flammable gases since it operates at atmospheric pressure.

According to one particular feature of the invention, the shroud may be equipped with a nonrechargeable purging container, for example of the "SPARKLET" type or aerosol can. These containers enable small leaks which have caught fire to be put out by purging with an inert gas (nitrogen or carbon dioxide). Purging may also be achieved using a conventional cylinder.

Other particular features and advantages of the invention will appear in the course of the description which follows, this being given with reference to the appended drawing which illustrates by way of nonlimiting example one embodiment thereof.

BRIEF DESCRIPTION OF THE DRAWING

The single appended FIGURE is a diagrammatic view of a gas leak confinement device according to the invention, fitted to a partly shown leaking cylinder.

DETAILED DESCRIPTION OF PREFERRED EMBODIMENTS

The device shown in the appended drawing is intended to confine and neutralize a leak F from a gas cylinder 1 termed the leaking cylinder, the leak F in the example shown being localized near the adapter 2 of the cylinder.

The confinement device comprises a flexible shroud 3, advantageously chosen from a transparent and nonflammable plastic which is inert with respect to the gases contained in the cylinder 1. For example in the case of hydrides such as $AsH_3$ and $PH_3$, polyvinyl chloride (PVC) could be suitable. In the case of toxic and corrosive gases, a material compatible with these gases should be chosen for the shroud 3.

The dimensions of the shroud 3 are chosen so as to minimize the volume necessary. However, the length of this shroud is, at the very least, such that it enables the adapter 2 and the head 1*a* of a cylinder 1 of the "B50" type to be accommodated. It is also possible to design shrouds adapted to ranges of capacities: one size for BO4s, one for B5s and one for B20/B50s.

The shroud 3 has an opening whose edge is applied against the surface of the cylinder 1, for example approximately at the base of the head 1*a*. Since the cylinder 1 is normally cylindrical, the edge of the opening of the shroud 3 is adapted to the geometry of the cross section of the cylinder 1 and, in this case, is consequently circular.

The edge of the opening of the shroud 3 is equipped with means for creating a seal at this point between the internal volume of the shroud 3 and the surface of the cylinder 1. These sealing means may, for example, be an adhesive tape, a rubber band, an inflatable tube or a fixing system with flexible clamping of a type known per se, or any other suitable equivalent means, enabling satisfactory sealing to be provided for gases at a slight overpressure in the shroud 3 with respect to atmospheric pressure.

The shroud 3 may be equipped with an inlet coupling 13 fixed to the shroud, said inlet coupling being provided with a valve 5 and allowing the shroud to be flushed with gas, using an inert gas such as nitrogen, as shown symbolically by the arrow K, so as to enable the shroud 3 to be purged.

The inflatable tube may be pierced with small holes distributed around its circumference and be supplied with purging gas which by escaping via these holes then enters the shroud.

The advantage of this arrangement resides in the fact that should there be a slight leak between the shroud 3 and the surface of the cylinder 1, it is the inert gas which escapes.

The inflatable tube may also be pressurized by a container of the "SPARKLET" type.

The device advantageously includes an outlet coupling 7 fixed to the shroud 3 and connected via a valve 10 to the line 6. The line 6 may thus remove the gases contained in the shroud to an appropriate means for neutralizing these gases. Depending on the risk and on the nature of the leaking gas, various approaches may be envisaged.

In the case of toxic gases, such as $AsH_3$ for example, the neutralizing means 8 may consist of a cartridge of absorbents of suitable capacity, for example a cartridge of the "Detoxal" type (registered trademark). In the case of corrosive acid gases (HCl, HBr, $SiH_2Cl_2$, etc.), the neutralizing means 8 may be a scrubber containing, for example, a bicarbonate solution. If the gases are mainly combustible (for example $SiH_4$), the line 6 may be connected to a neutralizing means consisting of an air-based burner.

A pressure gage 9 and a branch-off 11 with a valve 12, these being connected to the outlet coupling 7, may also advantageously be included with the device. The valve 12 may be set to a specific value and be connected to another gas-collecting line, not shown.

For safety reasons, the set values and the method of operating the device may be printed on the shroud 3 or on the packaging of the latter.

In its simplest embodiment, the device includes, in addition to the shroud 3, the coupling 7 and the line 6 which, as already indicated, may in the absence of neutralizing means such as one of those mentioned hereinabove, be simply immersed in a volume of water available near the leaking cylinder.

The flexible confinement device according to the invention may be provided in trucks for transporting toxic-gas cylinders, in repair shops, and in any plant in general where cylinders of toxic, corrosive or flammable gases may be found.

The manufacturing cost of such a confinement device is very substantially less than that of the known embodiments mentioned previously. This device may be manufactured in volume and is not bulky, unlike the known prior devices.

of course, the confinement system according to the invention can also be used if the gas leak occurs at the bottom of the cylinder 1 or any other part, as long as the shroud 3 is long enough.

In all cases, the flexible confinement device according to the invention is easy and very quick to use (less than one minute) compared to the known prior devices.

We claim:

1. A device for confining leaks of one or more gases contained in a gas cylinder, which comprises a shroud made of a flexible and nonflammable material which is inert with respect to the gas or gases contained in the cylinder and designed to partially envelope said cylinder, wherein said shroud has an opening provided with means for sealing said shroud to the surface of the cylinder and wherein the shroud is provided with an outlet coupling connected to a line for removing one or more of the gases to a means for neutralizing said one or more gases, wherein said shroud is adapted to be utilized with cylinders of different sizes and shapes.

2. The device as claimed in claim 1, wherein said means for neutralizing said one or more gases is (i) a cartridge of absorbents where said one or more gases are toxic, (ii) a scrubber system where said one or more gases are corrosive acid gases or, (iii) an air-based burner where said one or more gases are combustible gases.

3. The device as claimed in claim 2, wherein the outlet coupling is nonflammable.

4. The device as claimed in claim 1, wherein the outlet coupling is connected via a valve to the line, as well as to a pressure gage and to a branch-off with a valve set to a specific value.

5. The device as claimed in claim 1, wherein the sealing means comprises an adhesive tape, a rubber band, an inflatable tube, or a fixing system with flexible clamping.

6. The device as claimed in claim 1, wherein the shroud is made of a transparent plastic material and the outlet coupling is made of a nonflammable material.

7. The device as claimed in claim 1, wherein the shroud is equipped with an inlet coupling in order to allow the shroud to be flush with an inert gas.

8. The device as claimed in claim 1, wherein the shroud is provided with a purging container.

* * * * *